US012766906B2

(12) United States Patent
Özkan

(10) Patent No.: US 12,766,906 B2
(45) Date of Patent: Oct. 20, 2026

(54) MITIGATION OF JACK-KNIFING

(71) Applicant: VOLVO TRUCK CORPORATION, Gothenburg (SE)

(72) Inventor: Basar Özkan, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 19/380,079

(22) Filed: Nov. 5, 2025

(65) Prior Publication Data

US 2026/0131613 A1 May 14, 2026

(30) Foreign Application Priority Data

Nov. 12, 2024 (EP) .................................... 24212505

(51) Int. Cl.
*B60G 17/016* (2006.01)

(52) U.S. Cl.
CPC .... *B60G 17/0164* (2013.01); *B60G 2300/042* (2013.01); *B60G 2400/106* (2013.01)

(58) Field of Classification Search
CPC .......... B60G 17/0164; B60G 2300/042; B60G 2400/106
See application file for complete search history.

(56) References Cited

U.S. PATENT DOCUMENTS 3,136,566 A 6/1964 Harding
3,439,935 A 4/1969 Guidice
10,046,814 B2 * 8/2018 Siuchta ................ B62D 53/068
12,607,499 B2 * 4/2026 Zhang ........................ B60T 7/18
2012/0193889 A1 * 8/2012 Harrison ............... B60T 8/1764 701/79
2016/0332498 A1 * 11/2016 Lindsay ................. B62D 61/12
2018/0186208 A1 7/2018 Coombs
2021/0048333 A1 * 2/2021 Zhang ................... B60W 40/13
2021/0237574 A1 * 8/2021 Jahns .................... B60C 23/009
2022/0281464 A1 * 9/2022 Sandblom ......... B60W 50/0097
2023/0134660 A1 5/2023 Lewis et al.
2024/0208475 A1 * 6/2024 Buchert .................... B60T 8/92
2025/0100343 A1 * 3/2025 Foley ...................... B60L 53/31
(Continued)

FOREIGN PATENT DOCUMENTS

DE 102004010561 A1 9/2005
WO 2024132401 A1 6/2024

OTHER PUBLICATIONS

Extended European Search Report in corresponding European application No. 24212505.2 dated Apr. 16, 2025 (11 pages).

*Primary Examiner* — Toan C To
(74) *Attorney, Agent, or Firm* — Jeffri A. Kaminski; Venable LLP

(57) ABSTRACT

A computer system has processing circuitry to provide, in response to an indication that, for a vehicle combination comprising a tractor having a front axle, a first rear axle, and a second rear axle longitudinally further away from the front axle than the first rear axle is, and a trailer coupled to the tractor with a fifth-wheel coupling, a risk of jack-knifing is higher than a predefined threshold risk, an instruction to operate at least one actuator comprised in the tractor to redistribute a total axle load of the tractor in such a way that a first rear axle load on the first rear axle of the tractor is decreased and a second rear axle load on the second rear axle of the tractor is increased.

15 Claims, 5 Drawing Sheets

(56) References Cited

U.S. PATENT DOCUMENTS

| | | | | |
|---|---|---|---|---|
| 2025/0145131 | A1* | 5/2025 | Sarangamath | B60Q 1/44 |
| 2025/0223780 | A1* | 7/2025 | Venezia | E02F 9/2087 |
| 2025/0368260 | A1* | 12/2025 | Özkan | B62D 13/04 |
| 2026/0084671 | A1* | 3/2026 | Subramanian | B60T 8/1708 |

* cited by examiner

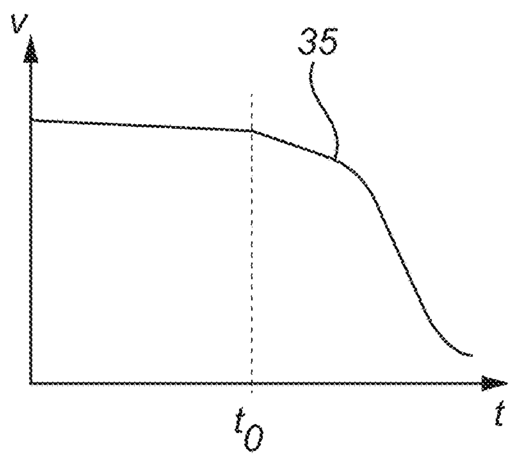
(prior art) Fig. 6A
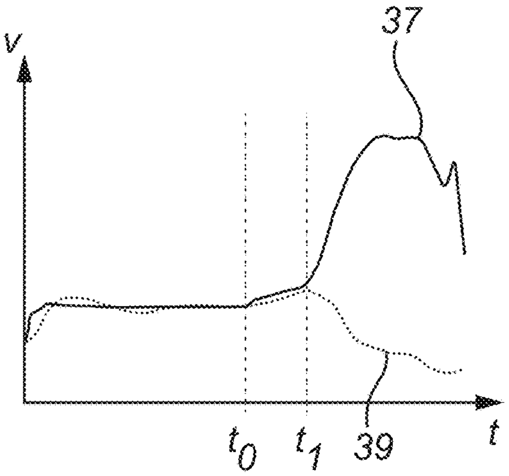
(prior art) Fig. 6B
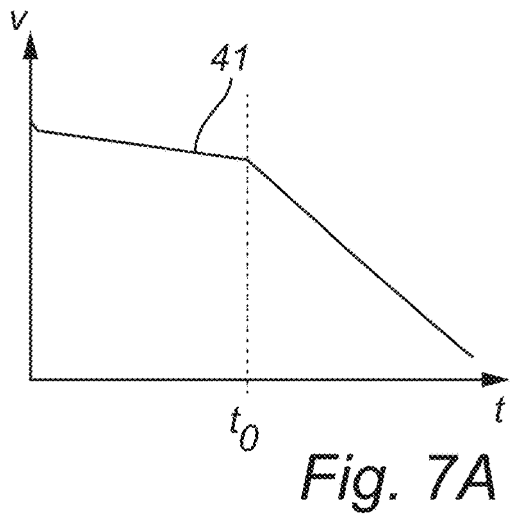
Fig. 7A
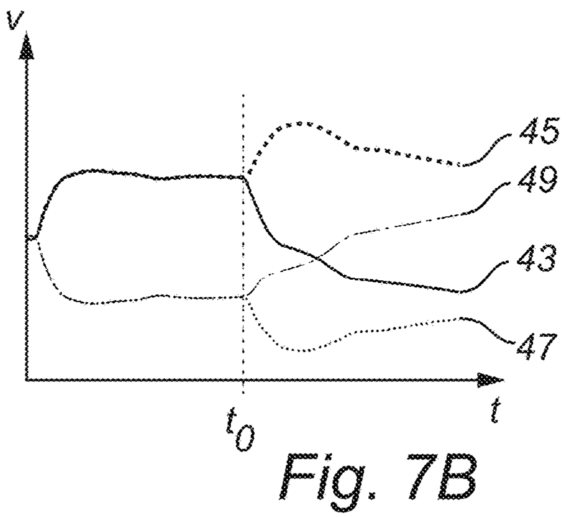
Fig. 7B
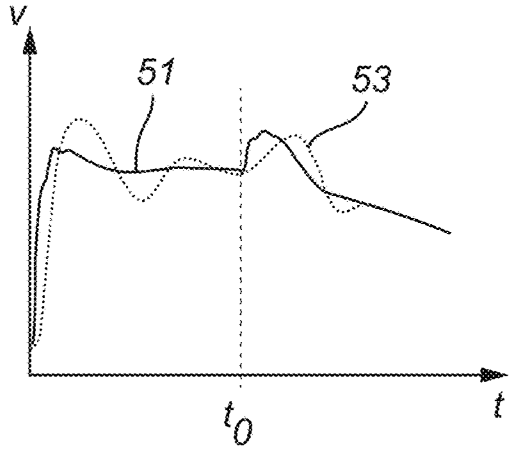
Fig. 7C

MITIGATION OF JACK-KNIFING

TECHNICAL FIELD

The disclosure relates generally to control of a vehicle. In particular aspects, the disclosure relates to mitigation of jack-knifing. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

In a vehicle combination, such as a tractor semitrailer combination, certain driving conditions may result in so-called jack-knifing.

It would be desirable to reduce the risk of jack-knifing in a vehicle combination comprising a tractor having a front axle, a first rear axle, and a second rear axle longitudinally further away from the front axle than the first rear axle, and a trailer coupled to the tractor with a fifth-wheel coupling.

SUMMARY

According to a first aspect of the disclosure, there is provided a computer system comprising processing circuitry configured to provide, in response to an indication that, for a vehicle combination comprising a tractor having a front axle, a first rear axle, and a second rear axle longitudinally further away from the front axle than the first rear axle is, and a trailer coupled to the tractor with a fifth-wheel coupling, a risk of jack-knifing is higher than a predefined threshold risk, an instruction to operate at least one actuator comprised in the tractor to redistribute a total axle load of the tractor in such a way that a first rear axle load on the first rear axle of the tractor is decreased and a second rear axle load on the second rear axle of the tractor is increased. The first aspect of the disclosure may seek to mitigate jack-knifing for a vehicle combination in which the tractor has two rear axles and at least one actuator controllable to redistribute the axle load of the tractor. The disclosure is based on the observation that the longitudinal position of the fifth-wheel coupling between tractor and trailer has an impact on the tendency for jack-knifing of a vehicle combination, and the realization that an effect on the tendency for jack-knifing analogous to that obtained by longitudinally moving the fifth-wheel coupling can be obtained by temporarily redistributing the total axle load of the tractor in such a way that the combined load on the two rear axles is shifted towards the rear of the tractor. A technical benefit may include to prevent or at least reduce the occurrence of jack-knifing for this type of vehicle combination. The redistribution of the axle load may be carried out even if this would result in an axle load of an individual axle that could be temporarily higher than an allowed axle load for the road, since the benefit of an avoided jack-knifing is higher than the implications of a temporary deviation from regulations.

Optionally in some examples, including in at least one preferred example, the at least one actuator may comprise a first rear suspension actuator configured to control a suspension of the first rear axle and a second rear suspension actuator configured to control a suspension of the second rear axle; and the processing circuitry may be configured to provide, to the second rear suspension actuator, an instruction to increase the second rear axle load on the second rear axle of the tractor. A technical benefit may include that control of a suspension actuator to increase the axle load may be fast, so that the jack-knifing mitigating axle load redistribution can be achieved shortly after the indication of the risk of jack-knifing being higher than the predefined threshold. This may increase the capability of avoiding jack-knifing.

Optionally in some examples, including in at least one preferred example, the processing circuitry may be configured to provide, to the first suspension actuator, an instruction to decrease the first rear axle load on the first rear axle of the tractor. A technical benefit may include that control of a suspension actuator to increase the axle load may be fast, so that the jack-knifing mitigating axle load redistribution can be achieved shortly after the indication of the risk of jack-knifing being higher than the predefined threshold. This may increase the capability of avoiding jack-knifing.

As an alternative or complement to controlling the first rear suspension actuator and/or the second rear suspension actuator, one or more other actuators may be controlled to achieve the desired axle load redistribution. For example, a lift axle actuator controllable to lift one of the first rear axle and the second rear axle may be used.

Optionally in some examples, including in at least one preferred example, the processing circuitry may be configured to provide the instruction to operate the at least one actuator in such a way that redistribution of the total axle load of the tractor is achieved within a predefined time from the indication of the risk of jack-knifing being higher than the threshold risk. In general, it may be beneficial to redistribute the axle load as soon as possible after recognizing that the risk of jack-knifing is elevated. There may, however, be limits to the capabilities of the at least one actuator and there may be a need for a gradual load distribution. For example, the predefined time may be shorter than 10 seconds. For example the predefined time may be shorter than 5 seconds. For example the predefined time may be shorter than two seconds. The timing may, however, depend on the definition of a jack-knifing risk metric and/or one how the threshold risk is set. For a relatively low threshold risk, the predefined time may be relatively long, and for a relatively high threshold risk, the predefined time may be relatively short.

Optionally in some examples, including in at least one preferred example, the processing circuitry may be configured to: receive a set of vehicle combination motion parameter values; and estimate the risk of jack-knifing based on the set of vehicle combination motion parameter values. A technical benefit may include that local estimation of the risk of jack-knifing may reduce the time to initiate the axle load redistribution. As an alternative or complement, an indication of an elevated risk of jack-knifing may be provided in the form of a manual indication from a driver of the vehicle combination, based on his/her experience, or an indication of an elevated risk of jack-knifing may be provided from an external source such as a remote vehicle monitor. In this context, it should be noted that various methods of estimating a risk of jack-knifing are, per se, known to those of ordinary skill in the art.

Optionally in some examples, including in at least one preferred example, the processing circuitry may be configured to estimate the risk of jack-knifing additionally based on a vehicle model of the vehicle combination. A technical benefit may include that a precision of the estimation of the risk of jack-knifing may be improved.

Optionally in some examples, including in at least one preferred example, the processing circuitry may be configured to: receive an indication of a braking operation for the vehicle combination; and provide the instruction to operate the at least one actuator comprised in the tractor in response to receiving the indication of the braking operation. A technical benefit may include that the redistribution of the axle load can be initiated faster, thereby reducing the risk of jack-knifing. For instance, a conditional increased risk of jack-knifing may have been identified. As an example, it may be estimated that a present articulation angle and yaw rate could lead to jack-knifing in the event of braking with a braking force greater than a threshold braking force. Then, initiation of the axle load distribution in response to a braking operation being started may reduce the time between jack-knifing conditions being fulfilled and the redistribution of the axle load being completed. In examples, the redistribution of the axle load may even be completed before the braking force becomes greater than the previously identified threshold braking force. It should be noted that the axle load redistribution may be initiated in response to identification of an expected braking operation. For instance, detection of a downhill slope may be an identification of an expected braking operation. In the case of an autonomous vehicle, an autonomous drive system may provide an indication of a planned braking event in advance. Receipt of such an indication may also be an identification of an expected braking operation.

Optionally in some examples, including in at least one preferred example, the processing circuitry may be configured to provide, in response to an indication that the risk of jack-knifing has changed from being higher than the predefined threshold risk to being lower than the predefined threshold risk, an instruction to operate the at least one actuator comprised in the tractor to redistribute the total axle load of the tractor in such a way that the first rear axle load on the first rear axle of the tractor is increased and the second rear axle load on the second rear axle of the tractor is decreased. A technical benefit may include that the vehicle combination may be operated with an axle load distribution optimized for normal operation once the elevated risk of jack-knifing no longer exists. This may provide for reduced wear of the vehicle combination, as well as reduced stress on the road.

The computer system according to examples of the present disclosure may advantageously be included in a suspension system of a tractor configured to be coupled to a trailer with a fifth-wheel coupling, the suspension system further comprising: a first rear suspension actuator configured to control a suspension of a first rear axle of the tractor; and a second rear suspension actuator configured to control a suspension of a second rear axle of the tractor.

The suspension system according to examples of the present disclosure may advantageously be included in a vehicle, further comprising a front axle; a first rear axle; a second rear axle longitudinally further away from the front axle than the first rear axle is; and a fifth-wheel coupling for coupling a trailer to the vehicle to thereby form a vehicle combination.

According to a second aspect of the disclosure, there is provided a computer-implemented method comprising providing, in response to an indication that, for a vehicle combination comprising a tractor having a front axle, a first rear axle, and a second rear axle longitudinally further away from the front axle than the first rear axle is, and a trailer coupled to the tractor with a fifth-wheel coupling, a risk of jack-knifing is higher than a predefined threshold risk, an instruction to operate at least one actuator comprised in the tractor to redistribute a total axle load of the tractor in such a way that a first rear axle load on the first rear axle of the tractor is decreased and a second rear axle load on the second rear axle of the tractor is increased. The second aspect of the disclosure may seek to mitigate jack-knifing for a vehicle combination in which the tractor has two rear axles and at least one actuator controllable to redistribute the axle load of the tractor. The disclosure is based on the observation that the longitudinal position of the fifth-wheel coupling between tractor and trailer has an impact on the tendency for jack-knifing of a vehicle combination, and the realization that an effect on the tendency for jack-knifing analogous to that obtained by longitudinally moving the fifth-wheel coupling can be obtained by temporarily redistributing the total axle load of the tractor in such a way that the combined load on the two rear axles is shifted to the rear of the tractor. A technical benefit may include to prevent or at least reduce the occurrence of jack-knifing for this type of vehicle combination. The redistribution of the axle load may be carried out even if this would result in an axle load of an individual axle that could be temporarily higher than an allowed axle load for the road, since the benefit of an avoided jack-knifing is higher than the implications of a temporary deviation from regulations.

Optionally in some examples, including in at least one preferred example, the at least one actuator may comprise a first rear suspension actuator configured to control a suspension of the first rear axle and a second rear suspension actuator configured to control a suspension of the second rear axle; and the method may comprise providing, to the second rear suspension actuator, an instruction to increase the second rear axle load on the second rear axle of the tractor. A technical benefit may include that control of a suspension actuator to increase the axle load may be fast, so that the jack-knifing mitigating axle load redistribution can be achieved shortly after the indication of the risk of jack-knifing being higher than the predefined threshold. This may increase the capability of avoiding jack-knifing.

Optionally in some examples, including in at least one preferred example, the method may comprise providing, to the first suspension actuator, an instruction to decrease the first rear axle load on the first rear axle of the tractor. A technical benefit may include that control of a suspension actuator to increase the axle load may be fast, so that the jack-knifing mitigating axle load redistribution can be achieved shortly after the indication of the risk of jack-knifing being higher than the predefined threshold. This may increase the capability of avoiding jack-knifing.

As an alternative or complement to controlling the first rear suspension actuator and/or the second rear suspension actuator, one or more other actuators may be controlled to achieve the desired axle load redistribution. For example, a lift axle actuator controllable to lift one of the first rear axle and the second rear axle may be used.

Optionally in some examples, including in at least one preferred example, the method may comprise providing the instruction to operate the at least one actuator in such a way that redistribution of the total axle load of the tractor is achieved within a predefined time from the indication of the risk of jack-knifing being higher than the threshold risk. In general, it may be beneficial to redistribute the axle load as soon as possible after recognizing that the risk of jack-knifing is elevated. There may, however, be limits to the capabilities of the at least one actuator and there may be a need for a gradual load distribution. For example, the predefined time may be shorter than 10 seconds. For example the predefined time may be shorter than 5 seconds. For example the predefined time may be shorter than two seconds. The timing may, however, depend on the definition of a jack-knifing risk metric and/or one how the threshold risk is set. For a relatively low threshold risk, the predefined time may be relatively long, and for a relatively high threshold risk, the predefined time may be relatively short.

Optionally in some examples, including in at least one preferred example, the processing circuitry may be configured to: receive a set of vehicle combination motion parameter values; and estimate the risk of jack-knifing based on the set of vehicle combination motion parameter values. A technical benefit may include that local estimation of the risk of jack-knifing may reduce the time to initiate the axle load redistribution. As an alternative or complement, an indication of an elevated risk of jack-knifing may be provided in the form of a manual indication from a driver of the vehicle combination, based on his/her experience, or an indication of an elevated risk of jack-knifing may be provided from an external source such as a remote vehicle monitor. In this context, it should be noted that various methods of estimating a risk of jack-knifing are, per se, known to those of ordinary skill in the art.

Optionally in some examples, including in at least one preferred example, the method may comprise estimate the risk of jack-knifing additionally based on a vehicle model of the vehicle combination. A technical benefit may include that a precision of the estimation of the risk of jack-knifing may be improved.

Optionally in some examples, including in at least one preferred example, the method may comprise: receiving an indication of a braking operation for the vehicle combination; and providing the instruction to operate the at least one actuator comprised in the tractor in response to receiving the indication of the braking operation. A technical benefit may include that the redistribution of the axle load can be initiated faster, thereby reducing the risk of jack-knifing. For instance, a conditional increased risk of jack-knifing may have been identified. As an example, it may be estimated that a present articulation angle and yaw rate could lead to jack-knifing in the event of braking with a braking force greater than a threshold braking force. Then, initiation of the axle load distribution in response to a braking operation being started may reduce the time between jack-knifing conditions being fulfilled and the redistribution of the axle load being completed. In examples, the redistribution of the axle load may even be completed before the braking force becomes greater than the previously identified threshold braking force. It should be noted that the axle load redistribution may be initiated in response to identification of an expected braking operation. For instance, detection of a downhill slope may be an identification of an expected braking operation. In the case of an autonomous vehicle, an autonomous drive system may provide an indication of a planned braking event in advance. Receipt of such an indication may also be an identification of an expected braking operation.

Optionally in some examples, including in at least one preferred example, the method may comprise providing, in response to an indication that the risk of jack-knifing has changed from being higher than the predefined threshold risk to being lower than the predefined threshold risk, an instruction to operate the at least one actuator comprised in the tractor to redistribute the total axle load of the tractor in such a way that the first rear axle load on the first rear axle of the tractor is increased and the second rear axle load on the second rear axle of the tractor is decreased. A technical benefit may include that the vehicle combination may be operated with an axle load distribution optimized for normal operation once the elevated risk of jack-knifing no longer exists. This may provide for reduced wear of the vehicle combination, as well as reduced stress on the road.

According to a third aspect of the disclosure, there is provided a computer program product comprising program code for performing, when executed by the processing circuitry, the method of the second aspect of the disclosure.

According to a fourth aspect of the disclosure, there is provided a non-transitory computer-readable storage medium comprising instructions, which when executed by the processing circuitry, cause the processing circuitry to perform the method of the second aspect of the disclosure.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

FIGS. 6A-B are exemplary diagrams schematically illustrating dynamic vehicle combination behavior according to a simulation without axle load redistribution.

FIGS. 7A-C are exemplary diagrams schematically illustrating dynamic vehicle combination behavior according to a simulation with axle load redistribution according to an example.

DETAILED DESCRIPTION

The detailed description set forth below provides information and examples of the disclosed technology with sufficient detail to enable those skilled in the art to practice the disclosure.

Figure 1:
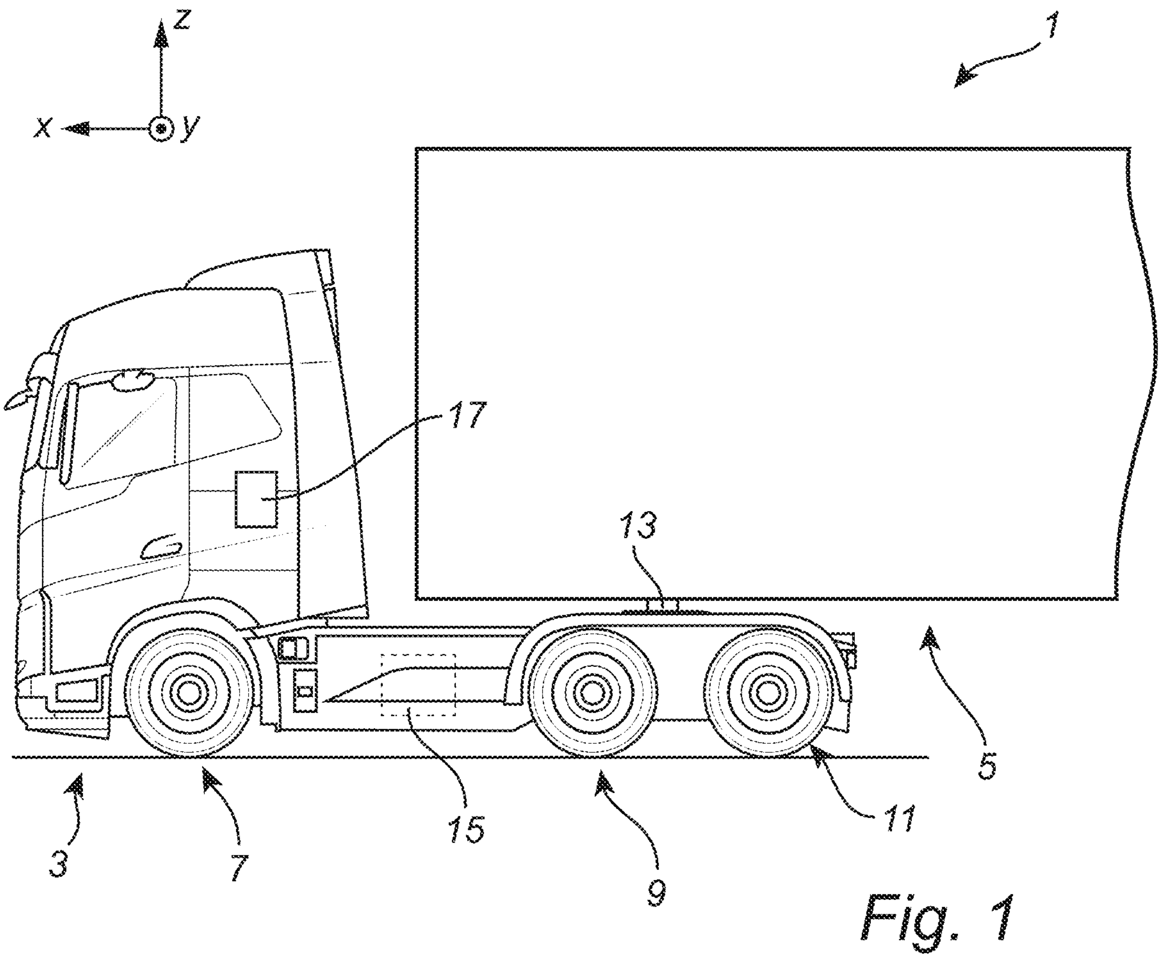
FIG. 1 is an exemplary vehicle according to an example.

FIG. 1 is an exemplary vehicle combination 1 according to an example. Referring to FIG. 1, the vehicle combination 1 comprises a tractor 3 and a trailer 5 coupled to the tractor 3 by a fifth-wheel coupling 13. The tractor 3 has a front axle 7, a first rear axle 9, and a second rear axle 11. The second rear axle 11 is longitudinally (in the x-direction according to well-established nomenclature for vehicle dynamics) further away from the front axle 7 than the first rear axle 9 is. In other words, the second rear axle 11 is arranged further to the rear of the tractor 3 than the first rear axle 9. As is schematically indicated in FIG. 1 by the dashed box, the tractor 3 comprises at least one actuator 15 controllable to redistribute the axle load of the tractor 3. The tractor 3 additionally comprises a computer system 17.

Figure 2:
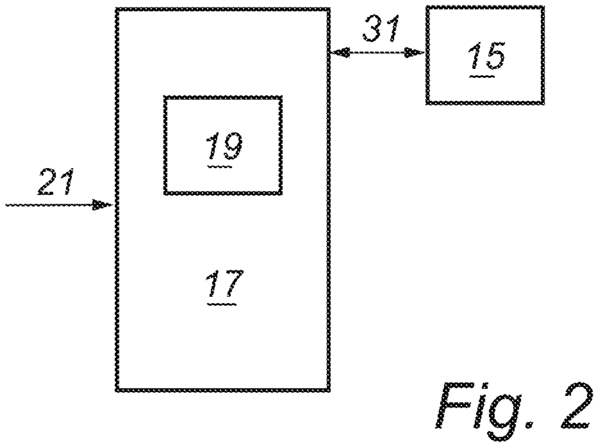
FIG. 2 is an exemplary computer system according to an example.

Referring to FIG. 2, the computer system 17 comprises processing circuitry 19 configured to provide, in response to an indication 21 that a risk of jack-knifing of the vehicle combination 1 in FIG. 1 is higher than a predefined threshold risk, an instruction 31 to operate the at least one actuator 15 to redistribute a total axle load of the tractor 3 in such a way that a first rear axle load on the first rear axle 9 of the tractor 3 is decreased and a second rear axle load on the second rear axle 11 of the tractor 3 is increased. This redistribution of the axle load will stabilize the vehicle combination 1, whereby the tendency of the vehicle combination 1 to go into jack-knifing will be reduced or even eliminated.

Figure 3:
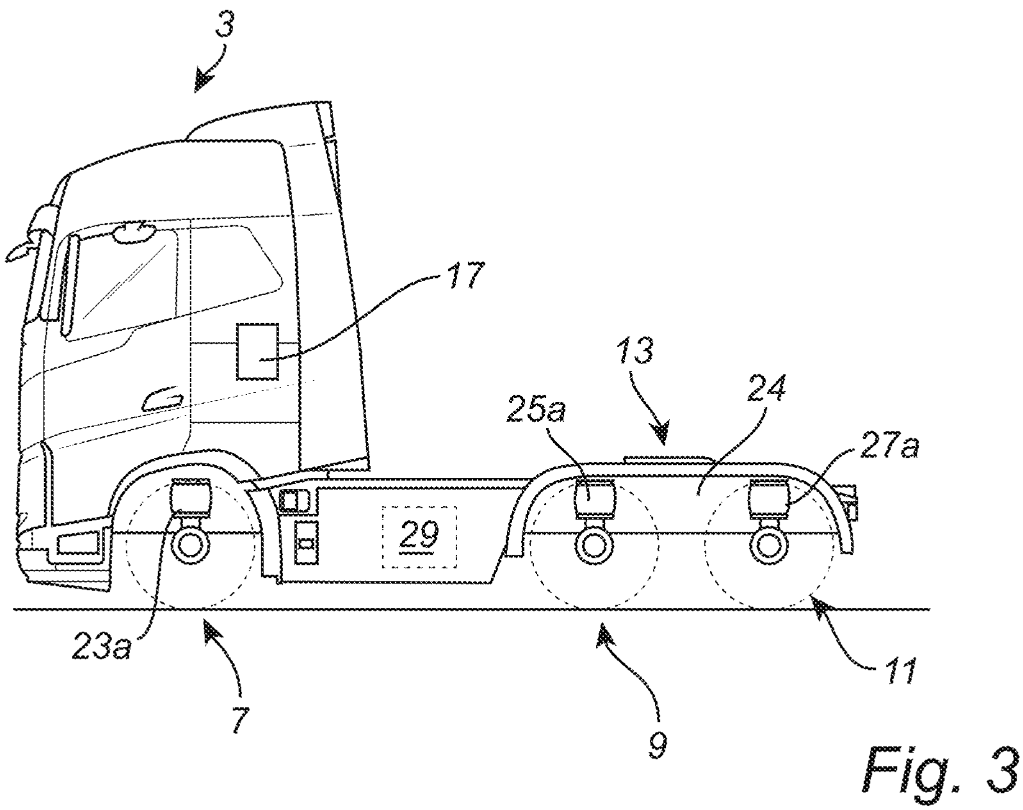
FIG. 3 is an exemplary vehicle according to an example.

Reference is now made to FIG. 3, which schematically shows an example of a vehicle 3 according to an example of the present disclosure. FIG. 3 illustrates an example of actuators that may be included in the at least one actuator 15 that was conceptually indicated in FIG. 1, in the form of front suspension actuators 23*a-b* (only one of these actuators 23*a* is visible in FIG. 3), first rear suspension actuators 25*a-b* (only one of these actuators 25*a* is visible in FIG. 3), and second rear suspension actuators 27*a-b* (only one of these actuators 27*a* is visible in FIG. 3). As is schematically indicated in FIG. 3, the front suspension actuators 23*a-b* couple the front axle 7 to a frame 24 of the vehicle 3, the first rear suspension actuators 25*a-b* couple the first rear axle 9 to the frame 24, and the second rear suspension actuators 27*a-b* couple the second rear axle 11 to the frame 24. As is, per se, well known to those of ordinary skill in the art, the suspension actuators act as springs between the axles and the frame 24. The suspension actuators 23*a-b*, 25*a-b*, 27*a-b* may be controllable, via suspension controller 29, to adjust the coupling between the respective suspension actuator and the frame 24. According to one example, each suspension actuator 23*a-b*, 25*a-b*, 27*a-b* may be provided in the form of an air bellows, and the air pressure in the air bellows can be controlled by providing corresponding instructions to the suspension controller 29. According to other examples, there may be provided suspension actuators that are electrically or hydraulically controllable.

Figure 4:
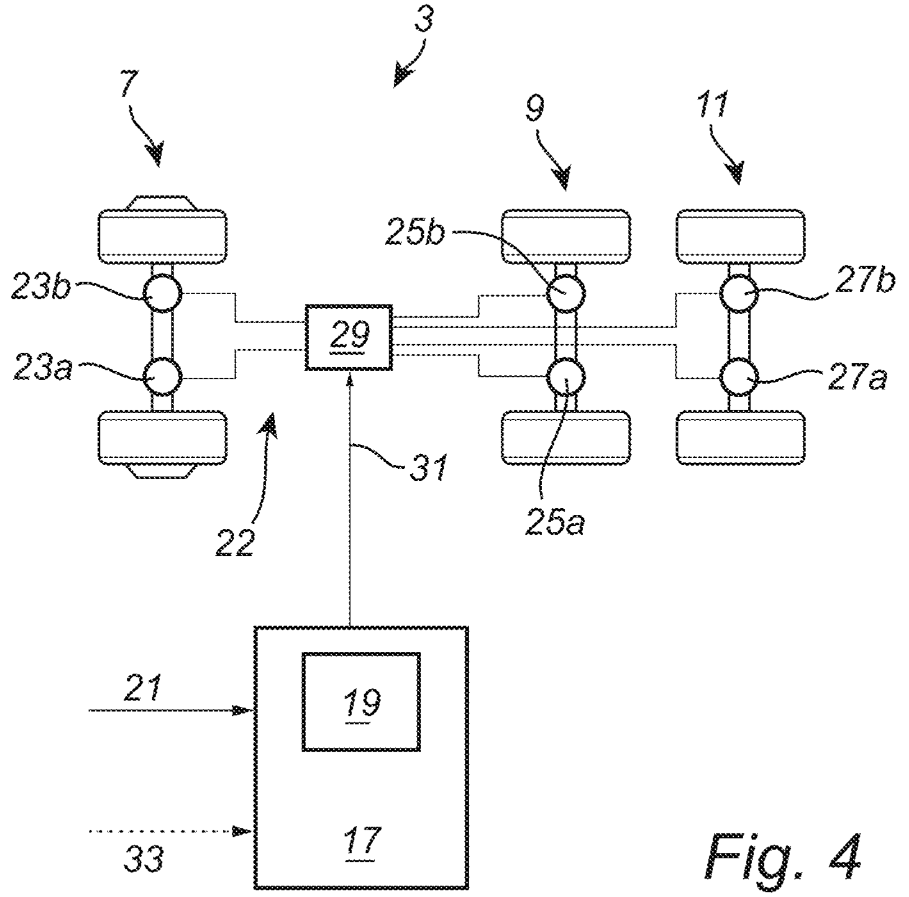
FIG. 4 is an exemplary suspension system according to an example.

FIG. 4 is an exemplary suspension system 22 according to an example. The suspension system 22 comprises the above-mentioned front suspension actuators 23*a-b*, first rear suspension actuators 25*a-b*, and second rear suspension actuators 27*a-b*, the above-mentioned suspension controller 29, and the above-mentioned computer system 17. As is schematically shown in FIG. 4, the processing circuitry 19 of the computer system 17 is configured to receive an indication 21 that the risk of jack-knifing is higher than a predefined threshold, and to provide an instruction 31 to the suspension controller 29 for redistributing a total axle load in such a way that a first rear axle load on the first rear axle 9 is decreased and a second rear axle load on the second rear axle 11 is increased. According to an example, this may be achieved by providing an instruction 31 to actuate the second rear suspension actuators 27*a-b* to increase the second rear axle load on the second rear axle 11. This may, for example, be achieved by providing an instruction 31 to the suspension controller 29 to increase an air pressure in the bellows of the second rear suspension actuators 27*a-b*. According to another example the desired redistribution of the total axle load may be achieved by providing an instruction 31 to actuate the first rear suspension actuators 25*a-b* to reduce the first rear axle load on the first rear axle 9. This may, for example, be achieved by providing an instruction 31 to the suspension controller 29 to reduce an air pressure in the bellows of the first rear suspension actuators 25*a-b*. A combination of increasing the air pressure in the bellows of the second rear suspension actuators 27*a-b* and reducing the air pressure in the bellows of the first rear suspension actuators 25*a-b* may also be possible, and may reduce the time needed to achieve the desired redistribution of the total axle load of the vehicle 3.

Optionally, as is schematically indicated by the dashed arrow 33 in FIG. 4, the processing circuitry 19 of the computer system 17 may be configured to receive an indication 33 of a braking operation for the vehicle combination 1, and provide the instruction 31 to operate the suspension actuators in response to receiving the indication 33 of the braking operation.

For example, the processing circuitry may be configured to identify a situation where the risk of jack-knifing would exceed the predefined threshold if the vehicle combination 1 were to be braked with a sufficiently high braking force. The indication 33 of the braking operation may then trigger the provision of the instruction 31 to operate the suspension actuators, for example as described above, to redistribute the axle load of the tractor 3.

In this context, it should be pointed out that control of the air pressure in air suspension bellows is only one example of actuators that may be used to redistribute the total axle load of the tractor 3 to reduce the tendency for jack-knifing of the vehicle combination 1. There may be other types of controllable suspension actuators, and lift-axle actuators may also be usable. It may further be feasible to control the tire pressure to redistribute the total axle load.

Figure 5:
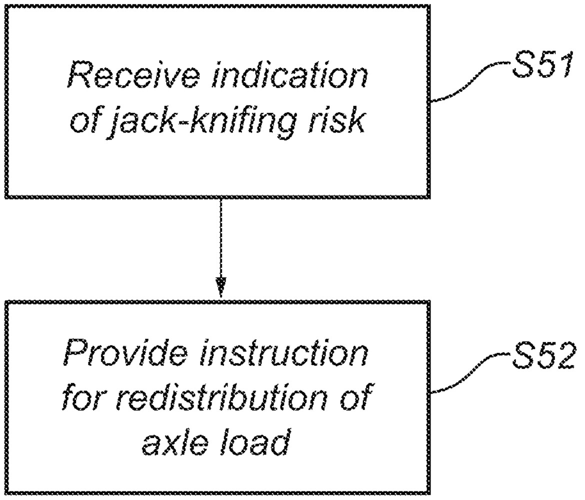
FIG. 5 is an exemplary method according to an example.

FIG. 5 is an exemplary method according to an example. Referring to the flow-chart in FIG. 5, with additional reference to the other figures as indicated, the method may first comprise receiving S51, by the processing circuitry 19 of the computer system 17 in FIG. 2, an indication 21 that the risk of jack-knifing of the vehicle combination 1 in FIG. 1 is higher than a predefined threshold risk. In response to the indication 21, the processing circuitry 19 of the computer system 17 may provide S52 an instruction 31 to at least one actuator 15 comprised in the tractor 3 to redistribute a total axle load of the tractor 3 in such a way that a first rear axle load on the first rear axle 9 of the tractor 3 is decreased and a second rear axle load on the second rear axle 11 of the tractor 3 is increased. This redistribution of the total axle load of the tractor 3 may prevent jack-knifing, that would otherwise have occurred. This has been verified using simulations, which will now be described with reference to FIGS. 6A-B and FIGS. 7A-C.

FIGS. 6A-B are exemplary diagrams schematically illustrating dynamic vehicle combination behavior according to a simulation without axle load redistribution.

This simulation has been carried out for a vehicle combination with a tractor-semitrailer configuration like that shown in FIG. 1, but without axle load redistribution. The simulation is for a slippery road ($\mu$=0.3, like snowy conditions). During this simulation, the vehicle combination 1 is initially traveling at 80 km/h and starts to turn left. Once the vehicle combination reaches close to steady state, brake torque is applied to all wheels. To increase the risk of jack-knifing, for illustration purposes, the brake torque is unevenly distributed, with a lower brake torque applied to the wheels of the trailer.

The diagram in FIG. 6A illustrates the longitudinal speed 35 of the vehicle combination 1 as a function of time. The braking starts at the time to. The diagram in FIG. 6B illustrates the yaw rate 37 of the tractor 3 and the yaw rate 39 of the trailer 5, respectively, as a function of time. As can be understood from the diagram in FIG. 6B, the tractor 3 starts folding onto the trailer 5 at the time $t_1$, and jack-knifing occurs.

FIGS. 7A-C are exemplary diagrams schematically illustrating dynamic vehicle combination behavior according to a simulation with axle load redistribution according to an example.

This simulation has also been carried out for a vehicle combination with a tractor-semitrailer configuration like that shown in FIG. 1, but this time axle load redistribution according to an example of the present disclosure has been employed. The simulation is for a slippery road (μ=0.3, like snowy conditions). During this simulation, the vehicle combination 1 is initially traveling at 80 km/h and starts to turn. Once the vehicle combination reaches close to steady state, brake torque is applied to all wheels. To increase the risk of jack-knifing, for illustration purposes, the brake torque is unevenly distributed, with a lower brake torque applied to the wheels of the trailer.

The diagram in FIG. 7A illustrates the longitudinal speed 41 of the vehicle combination 1 as a function of time. The braking starts at the time to.

The diagram in FIG. 7B illustrates the wheel loads as a function of time. The curves are labeled as follows: first rear axle right hand side—43, second rear axle right hand side—45, first rear axle left hand side—47, second rear axle left hand side—49. The axle load on the first rear axle corresponds to the sum of the wheel loads on the right hand side and the left hand side of the first rear axle, and the axle load on the second rear axle corresponds to the sum of the wheel loads on the right hand side and the left hand side of the second rear axle. It can thus be understood from the diagram in FIG. 7B that the first rear axle load and the second rear axle load are substantially equal before the time to. Starting at the time to, in response to an indication that the risk of jack-knifing is higher than a predefined threshold, the total axle load of the tractor 3 is distributed as described further above. This is reflected in the diagram in FIG. 7B by the increasing wheel loads on the right hand side 45 and left hand side 49 of the second rear axle 11, and the decreasing wheel loads on the right hand side 43 and the left hand side 47 of the first rear axle 9.

FIG. 7C illustrates the yaw rate 51 of the tractor 3 and the yaw rate 53 of the trailer 5, respectively, as a function of time. As can be understood from the diagram in FIG. 7C, there are some oscillations when the braking starts (at the time to), but the trailer yaw rate 53 follows the tractor yaw rate 51, which means that there is no jack-knifing.

Figure 8:
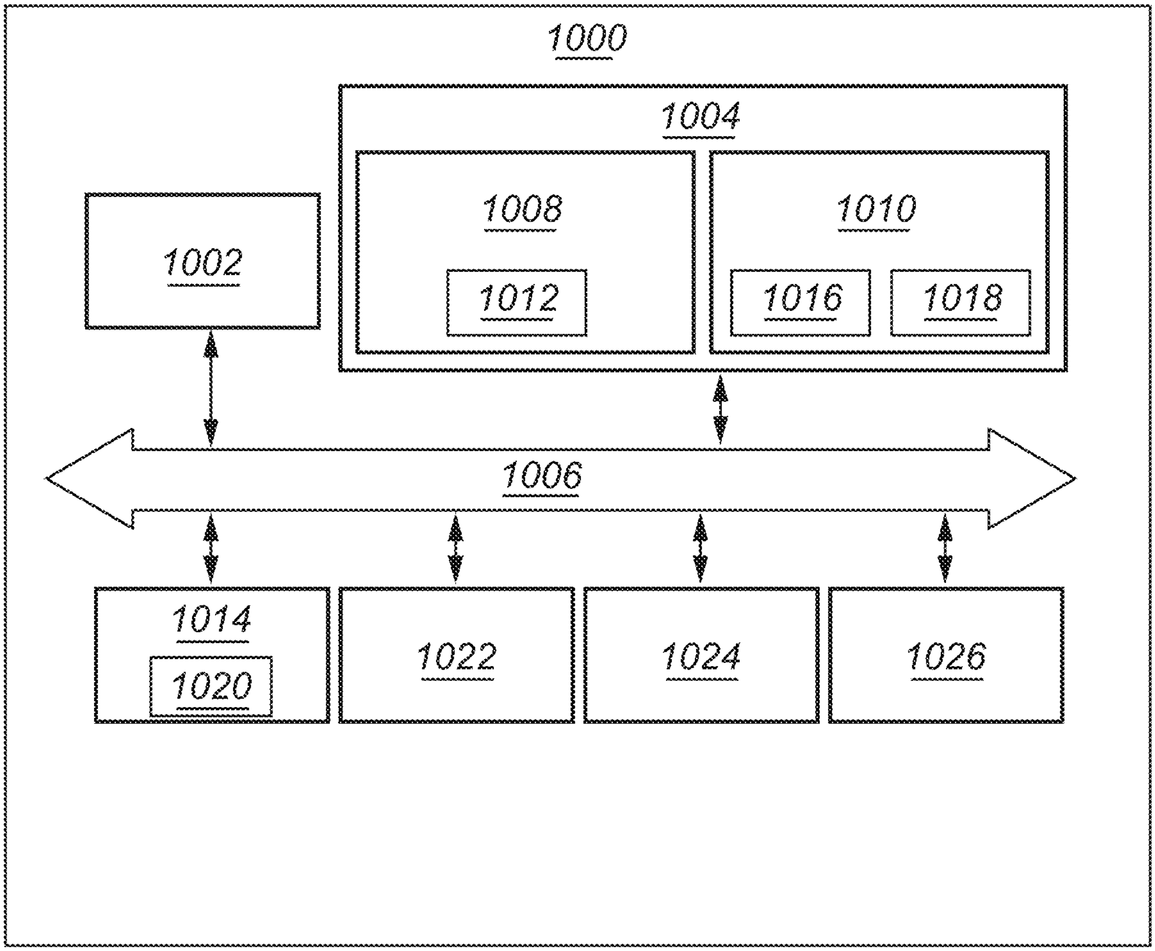
FIG. 8 is a schematic diagram of an exemplary computer system for implementing examples disclosed herein, according to an example.

FIG. 8 is a schematic diagram of a computer system 1000 for implementing examples disclosed herein, such as for implementing examples of the computer system 17 according to examples. The computer system 1000 is adapted to execute instructions from a computer-readable medium to perform these and/or any of the functions or processing described herein. The computer system 1000 may be connected (e.g., networked) to other machines in a LAN, an intranet, an extranet, or the Internet, or by direct wired or wireless communication. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include processing circuitry 1002 (e.g., processing circuitry including one or more processor devices or control units), a memory 1004, and a system bus 1006. The computer system 1000 may include at least one computing device having the processing circuitry 1002. The system bus 1006 provides an interface for system components including, but not limited to, the memory 1004 and the processing circuitry 1002. The processing circuitry 1002 may include any number of hardware components for conducting data or indication processing or for executing computer code stored in memory 1004. The processing circuitry 1002 may, for example, include a general-purpose processor, an application specific processor, a Digital indication Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1002 may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processing circuitry 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with processing circuitry 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program 1020 stored on a transitory or non-transitory computer-usable or computer-readable storage medium (e.g., single medium or multiple media), such as the storage device 1014, which includes complex programming instructions (e.g., complex computer-readable program code) to cause the processing circuitry 1002 to carry out actions described herein. Thus, the computer-readable program code of the computer program 1020 can comprise software instructions for implementing the functionality of the examples described herein when executed by the processing circuitry 1002. In some examples, the storage device 1014 may be a computer program product (e.g., readable storage medium) storing the computer program 1020 thereon, where at least a portion of a computer program 1020 may be loadable (e.g., into a processor) for implementing the functionality of the examples described herein when executed by the processing circuitry 1002. The processing circuitry 1002 may serve as a controller or control system for the computer system 1000 that is to implement the functionality described herein.

The computer system 1000 may include an input device interface 1022 configured to receive input and selections to be communicated to the computer system 1000 when executing instructions, such as from a keyboard, mouse, touch-sensitive surface, etc. Such input devices may be connected to the processing circuitry 1002 through the input device interface 1022 coupled to the system bus 1006 but can be connected through other interfaces, such as a parallel port, an Institute of Electrical and Electronic Engineers (IEEE) 1394 serial port, a Universal Serial Bus (USB) port, an IR interface, and the like. The computer system 1000 may include an output device interface 1024 configured to forward output, such as to a display, a video display unit (e.g., a liquid crystal display (LCD) or a cathode ray tube (CRT)). The computer system 1000 may include a communications interface 1026 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system comprising processing circuitry configured to provide, in response to an indication that, for a vehicle combination comprising a tractor having a front axle, a first rear axle, and a second rear axle longitudinally further away from the front axle than the first rear axle is, and a trailer coupled to the tractor with a fifth-wheel coupling, a risk of jack-knifing is higher than a predefined threshold risk, an instruction to operate at least one actuator comprised in the tractor to redistribute a total axle load of the tractor in such a way that a first rear axle load on the first rear axle of the tractor is decreased and a second rear axle load on the second rear axle of the tractor is increased.

Example 2: The computer system of example 1, wherein: the at least one actuator comprises a first rear suspension actuator configured to control a suspension of the first rear axle and a second rear suspension actuator configured to control a suspension of the second rear axle; and the processing circuitry is configured to provide, to the second rear suspension actuator, an instruction to increase the second rear axle load on the second rear axle of the tractor.

Example 3: The computer system of example 2, wherein the processing circuitry is configured to provide, to the first suspension actuator, an instruction to decrease the first rear axle load on the first rear axle of the tractor.

Example 4: The computer system of any of examples 1-3, wherein the processing circuitry is configured to provide the instruction to operate the at least one actuator in such a way that redistribution of the total axle load of the tractor is achieved within a predefined time from the indication of the risk of jack-knifing being higher than the threshold risk.

Example 5: The computer system of any of examples 1-4, wherein the processing circuitry is configured to: receive a set of vehicle combination motion parameter values; and estimate the risk of jack-knifing based on the set of vehicle combination motion parameter values.

Example 6: The computer system of example 5, wherein the processing circuitry is configured to estimate the risk of jack-knifing additionally based on a vehicle model of the vehicle combination.

Example 7: The computer system of any of examples 1-6, wherein the processing circuitry is configured to: receive an indication of a braking operation for the vehicle combination; and provide the instruction to operate the at least one actuator comprised in the tractor in response to receiving the indication of the braking operation.

Example 8: The computer system of any of examples 1-7, wherein the processing circuitry is configured to provide, in response to an indication that the risk of jack-knifing has changed from being higher than the predefined threshold risk to being lower than the predefined threshold risk, an instruction to operate the at least one actuator comprised in the tractor to redistribute the total axle load of the tractor in such a way that the first rear axle load on the first rear axle of the tractor is increased and the second rear axle load on the second rear axle of the tractor is decreased.

Example 9: A suspension system of a tractor configured to be coupled to a trailer with a fifth-wheel coupling, the suspension system comprising: a first rear suspension actuator configured to control a suspension of a first rear axle of the tractor; a second rear suspension actuator configured to control a suspension of a second rear axle of the tractor; and the computer system of any of examples 1-8.

Example 10: A vehicle comprising: a front axle; a first rear axle; a second rear axle longitudinally further away from the front axle than the first rear axle is; a fifth-wheel coupling for coupling a trailer to the vehicle to thereby form a vehicle combination; and the suspension system of example 9.

Example 11: A computer-implemented method comprising: providing, in response to an indication that, for a vehicle combination comprising a tractor having a front axle, a first rear axle, and a second rear axle longitudinally further away from the front axle than the first rear axle is, and a trailer coupled to the tractor with a fifth-wheel coupling, a risk of jack-knifing is higher than a predefined threshold risk, an instruction to operate at least one actuator comprised in the tractor to redistribute a total axle load of the tractor in such a way that a first rear axle load on the first rear axle of the tractor is decreased and a second rear axle load on the second rear axle of the tractor is increased.

Example 12: The method of example 11, wherein: the at least one actuator comprises a first rear suspension actuator configured to control a suspension of the first rear axle and a second rear suspension actuator configured to control a suspension of the second rear axle; and the method comprises providing, to the second rear suspension actuator, an instruction to increase the second rear axle load on the second rear axle of the tractor.

Example 13: The method of example 12, wherein the method comprises providing, to the first suspension actuator, an instruction to decrease the first rear axle load on the first rear axle of the tractor.

Example 14: The method of any of examples 11-13, wherein the method comprises providing the instruction to operate the at least one actuator in such a way that redistribution of the total axle load of the tractor is achieved within a predefined time from the indication of the risk of jack-knifing being higher than the threshold risk.

Example 15: The method of any of examples 11-14, wherein the method comprises: receiving a set of vehicle combination motion parameter values; and estimating the risk of jack-knifing based on the set of vehicle combination motion parameter values.

Example 16: The method of example 15, wherein the method comprises estimating the risk of jack-knifing additionally based on a vehicle model of the vehicle combination.

Example 17: The method of any of examples 11-16, wherein the method comprises: receiving an indication of a braking operation for the vehicle combination; and providing the instruction to operate the at least one actuator comprised in the tractor in response to receiving the indication of the braking operation.

Example 18: The method of any of examples 11-17, wherein the method comprises providing, in response to an indication that the risk of jack-knifing has changed from being higher than the predefined threshold risk to being lower than the predefined threshold risk, an instruction to operate the at least one actuator comprised in the tractor to redistribute the total axle load of the tractor in such a way that the first rear axle load on the first rear axle of the tractor is increased and the second rear axle load on the second rear axle of the tractor is decreased.

Example 19: A computer program product comprising program code for performing, when executed by the processing circuitry comprised in the computer system of any one of examples 1-8, the method of any of examples 11-18.

Example 20: A non-transitory computer-readable storage medium comprising instructions, which when executed by the processing circuitry comprised in the computer system of any one of examples 1-8, cause the processing circuitry to perform the method of any of example 11-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to provide, in response to an indication that, for a vehicle combination comprising a tractor having a front axle, a first rear axle, and a second rear axle longitudinally further away from the front axle than the first rear axle is, and a trailer coupled to the tractor with a fifth-wheel coupling, a risk of jack-knifing is higher than a predefined threshold risk, an instruction to operate at least one actuator comprised in the tractor to redistribute a total axle load of the tractor in such a way that a first rear axle load on the first rear axle of the tractor is decreased and a second rear axle load on the second rear axle of the tractor is increased.

2. The computer system of claim 1, wherein:

the at least one actuator comprises a first rear suspension actuator configured to control a suspension of the first rear axle and a second rear suspension actuator configured to control a suspension of the second rear axle; and the processing circuitry is configured to provide, to the second rear suspension actuator, an instruction to increase the second rear axle load on the second rear axle of the tractor.

3. The computer system of claim 2, wherein the processing circuitry is configured to provide, to the first suspension actuator, an instruction to decrease the first rear axle load on the first rear axle of the tractor.

4. The computer system of claim 1, wherein the processing circuitry is configured to provide the instruction to operate the at least one actuator in such a way that redistribution of the total axle load of the tractor is achieved within a predefined time from the indication of the risk of jack-knifing being higher than the threshold risk.

5. The computer system of claim 1, wherein the processing circuitry is configured to:

receive a set of vehicle combination motion parameter values; and estimate the risk of jack-knifing based on the set of vehicle combination motion parameter values.

6. The computer system of claim 5, wherein the processing circuitry is configured to estimate the risk of jack-knifing additionally based on a vehicle model of the vehicle combination.

7. The computer system of claim 1, wherein the processing circuitry is configured to:

receive an indication of a braking operation for the vehicle combination; and provide the instruction to operate the at least one actuator comprised in the tractor in response to receiving the indication of the braking operation.

8. The computer system of claim 1, wherein the processing circuitry is configured to provide, in response to an indication that the risk of jack-knifing has changed from being higher than the predefined threshold risk to being lower than the predefined threshold risk, an instruction to operate the at least one actuator comprised in the tractor to redistribute the total axle load of the tractor in such a way that the first rear axle load on the first rear axle of the tractor is increased and the second rear axle load on the second rear axle of the tractor is decreased.

9. A suspension system of a tractor configured to be coupled to a trailer with a fifth-wheel coupling, the suspension system comprising:

a first rear suspension actuator configured to control a suspension of a first rear axle of the tractor;

a second rear suspension actuator configured to control a suspension of a second rear axle of the tractor; and the computer system of claim 1.

10. A vehicle comprising:

a front axle;

a first rear axle;

a second rear axle longitudinally further away from the front axle than the first rear axle is;

a fifth-wheel coupling for coupling a trailer to the vehicle to thereby form a vehicle combination; and the suspension system of claim 9.

11. A computer-implemented method comprising: providing, in response to an indication that, for a vehicle combination comprising a tractor having a front axle, a first rear axle, and a second rear axle longitudinally further away from the front axle than the first rear axle is, and a trailer coupled to the tractor with a fifth-wheel coupling, a risk of jack-knifing is higher than a predefined threshold risk, an instruction to operate at least one actuator comprised in the tractor to redistribute a total axle load of the tractor in such a way that a first rear axle load on the first rear axle of the tractor is decreased and a second rear axle load on the second rear axle of the tractor is increased.

12. The method of claim 11, wherein:

the at least one actuator comprises a first rear suspension actuator configured to control a suspension of the first rear axle and a second rear suspension actuator configured to control a suspension of the second rear axle; and the method comprises providing, to the second rear suspension actuator, an instruction to increase the second rear axle load on the second rear axle of the tractor.

13. The method of claim 12, wherein the method comprises providing, to the first suspension actuator, an instruction to decrease the first rear axle load on the first rear axle of the tractor.

14. The method of claim 11, wherein the method comprises providing, in response to an indication that the risk of jack-knifing has changed from being higher than the predefined threshold risk to being lower than the predefined threshold risk, an instruction to operate the at least one actuator comprised in the tractor to redistribute the total axle load of the tractor in such a way that the first rear axle load on the first rear axle of the tractor is increased and the second rear axle load on the second rear axle of the tractor is decreased.

15. A computer program product comprising program code for performing, when executed by processing circuitry, the method of claim 1.

* * * * *